US008756581B2

(12) United States Patent
Castanos et al.

(10) Patent No.: US 8,756,581 B2
(45) Date of Patent: Jun. 17, 2014

(54) ADAPTIVE NEXT-EXECUTING-CYCLE TRACE SELECTION FOR TRACE-DRIVEN CODE OPTIMIZERS

(75) Inventors: Jose G. Castanos, Yorktown Heights, NY (US); Hiroshige Hayashizaki, Kawasaki (JP); Hiroshi Inoue, Yokohama (JP); Mauricio J. Serrano, Bronx, NY (US); Peng Wu, Mr. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 13/020,222

(22) Filed: Feb. 3, 2011

(65) Prior Publication Data

US 2012/0204164 A1 Aug. 9, 2012

(51) Int. Cl.
*G06F 9/44* (2006.01)
*G06F 9/45* (2006.01)
*G06F 11/00* (2006.01)

(52) U.S. Cl.
USPC ........... 717/128; 717/148; 717/153; 717/154; 714/45

(58) Field of Classification Search
None
See application file for complete search history.

(56) References Cited

U.S. PATENT DOCUMENTS

| 5,995,754 | A | * | 11/1999 | Holzle et al. ................ 717/158 |
| 6,164,841 | A | | 12/2000 | Mattson, Jr. et al. |
| 6,189,141 | B1 | | 2/2001 | Benitez et al. |
| 6,351,844 | B1 | * | 2/2002 | Bala ............................... 717/128 |
| 6,470,492 | B2 | | 10/2002 | Bala et al. |
| 6,631,515 | B1 | * | 10/2003 | Berstis .......................... 717/140 |
| 6,647,491 | B2 | | 11/2003 | Hsu et al. |
| 6,785,801 | B2 | | 8/2004 | Duesterwald et al. |
| 7,694,281 | B2 | | 4/2010 | Wang et al. |
| 7,725,885 | B1 | | 5/2010 | Pradhan et al. |
| 2005/0081107 | A1 | | 4/2005 | DeWitt et al. |
| 2007/0226700 | A1 | | 9/2007 | Gal et al. |
| 2010/0011209 | A1 | | 1/2010 | Kiriansky et al. |
| 2010/0083236 | A1 | | 4/2010 | Porto et al. |

OTHER PUBLICATIONS

Hiniker et al. "Improving Region Selection in Dynamic Optimization Systems" 2005, IEEE, Proceedings of the 38th Annual IEEE/ACM International Symposium on Microarchitecture (MICRO'05).*
Rosner, et al., "Power Awareness through Selective Dynamically Optimized Traces", ACM SIGARCH Computer Architecture News, vol. 32, Issue 2 (Mar. 2004), p. 162.
Behar, et al., "Trace cache sampling filter", ACMTransactions on Computer Systems, v. 25, n. 1, Feb. 2007.

(Continued)

*Primary Examiner* — James D Rutten
(74) *Attorney, Agent, or Firm* — Preston J. Young, Esq.; McGinn IP Law Group, PLLC

(57) ABSTRACT

An apparatus includes a processor for executing instructions at runtime and instructions for dynamically compiling the set of instructions executing at runtime. A memory device stores the instructions to be executed and the dynamic compiling instructions. A memory device serves as a trace buffer used to store traces during formation during the dynamic compiling. The dynamic compiling instructions includes a next-executing-cycle (N-E-C) trace selection process for forming traces for the instructions executing at runtime. The N-E-C trace selection process continues through an existing trace-head when forming traces without terminating a recording of a current trace if an existing trace-head is encountered.

22 Claims, 11 Drawing Sheets

N-E-C Selection 302

(56) References Cited

OTHER PUBLICATIONS

Rosner et al., "Selecting long atomic traces for high coverage", Proceedings of the 17th annual international conference on Supercomputing, Session: Processor microarchitecture I, pp. 2-11, 2003.

Patel et al., "Improving trace cache effectivenes with branch promotion and trace packing", Proceedings of the 25th annual international symposium on Computer architecture (ISCA '98), vol. 26, Issue 3 (Jun. 1998), pp. 262-271.

Ramirez et al. "Software trace cache", Proceedings of the 13th international conference on Supercomputing, pp. 119-126, Rhodes, Greece, 1999.

* cited by examiner

300

```
class Color
{
  void paint(){C;}
}
class Red  extends Color
{
void paint(){R;}
}
class Blue extends Color
{
void paint(){B;}
}
void foo (Color c)
{
  while(...){
    W;
    c.paint();
    X;
  }
}
void bar (Red r)
{
  while(...){
    Y;
    r.paint();
    Z;
  }
}
```

FIGURE 3A

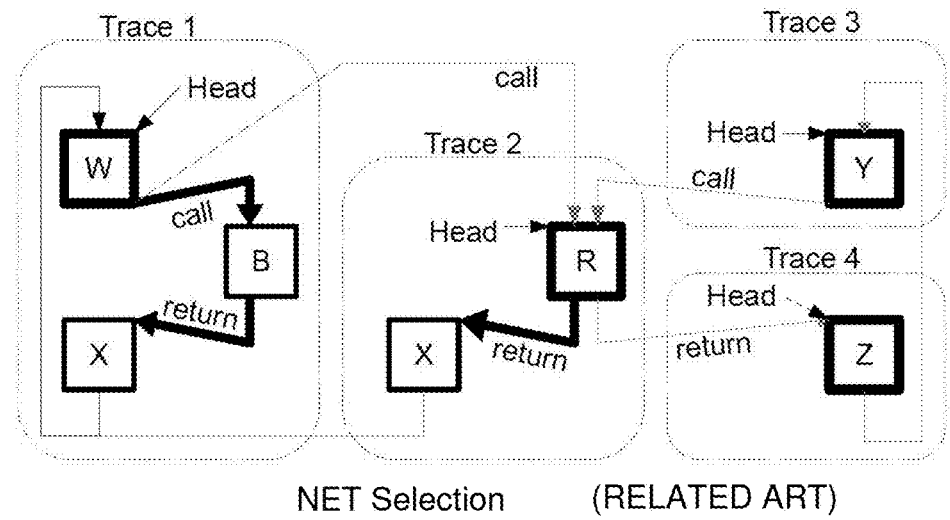
NET Selection (RELATED ART)
FIGURE 3B
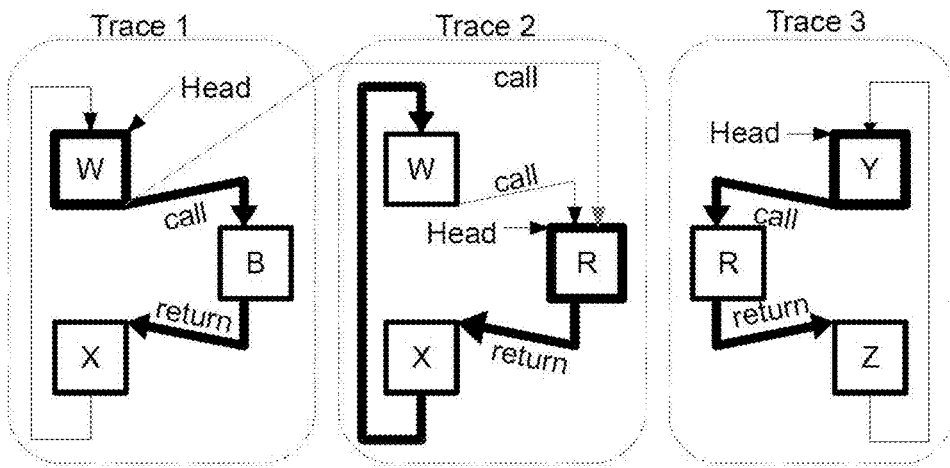
N-E-C Selection
302   FIGURE 3C

400

```
while(...)
{
    if(A)
        B;
    else
        C;
    D;
}
```

410

NET Selection (RELATED ART)

N-E-C Selection

800

900

ADAPTIVE NEXT-EXECUTING-CYCLE TRACE SELECTION FOR TRACE-DRIVEN CODE OPTIMIZERS

BACKGROUND OF THE INVENTION

1. Field of the Invention

The present invention generally relates to compilation processing of computer code. More specifically, a modification to the conventional NET (Next-Executing-Tail) selection provides a new selection referred to as N-E-C (Next-Executing-Cycle) selection, in combination with an adaptive trace selection mechanism, permits production of high quality traces without excessive code explosion.

2. Description of the Related Art

A compiler is a computer program that transforms source code written in a programming language, the source language, into another computer language, the target language, often having a binary form known as object code. Compilation is typically executed to create an executable program from a computer program stored in higher level language.

For compilers, trace-driven systems are becoming important in binary translation systems and dynamic optimizers. Examples include Dynamo, a binary optimizer; TraceMonkey, a trace-based JIT (Just In Time compiler) for Javascript (in Firefox v3.5); and DynamoRlO, a dynamic software translator.

Trace-based code optimizers compile traces (sequences of executed instructions formed at runtime) instead of methods. In the context of the present invention, the term "methods" is used to broadly refer to functions, subroutines, and methods that are defined in conventional programming languages. Traces are easier to optimize due to the simple topology, which is mostly linear. Traces can naturally incorporate runtime properties, making it an attractive approach to optimize highly dynamic languages.

Trace selection is the process to form traces out of executed instructions at runtime and is an active area of research and patent activities because formation of traces is key to the effectiveness of a trace-based system.

The ability of a trace-driven language compiler to produce quality codes depends heavily on the traces formed by its selection engine. The present invention describes a trace selection method to form quality traces that are amiable to effective code optimizers while avoiding excessive code explosion and still being able to achieve a high trace cache hit-ratio.

In trace-based compilation or dynamic translation systems, a trace is treated as a unit of compilation and optimization. A trace is a single-entry, multiple-exit entity. Trace selection is the process of forming traces, typically a sequence of instructions or basic blocks, out of hot execution paths at runtime. Once a trace is compiled, generated binary code is placed in a memory area called a "trace cache." When the interpreter reaches the entry address of a compiled trace (trace-head), the interpreter transfers control to the generated binary code in the trace cache. When the program reaches the end of the generated binary (trace-exit), or branches out from the middle of a compiled trace (side-exit), it resumes the interpreter to execute or jumps into the next compiled trace if it exists in the trace cache.

Many trace selection algorithms follow the two-step approach pioneered by the next-executing-tail (NET) selection in Dynamo and in U.S. Pat. No. 6,470,492 to Bala, et al, referred to as "NET-like trace selection", as exemplarily shown in the flowchart 100 of FIG. 1.

In a first step 101, trace-head selection identifies the likely starting point of a hot region using a lightweight mechanism. It starts with some heuristics to identify an initial set of targets 103 as potential trace-heads to monitor. The identified target is allocated a hotness counter 104, which is incremented every time the target is encountered.

One important set of potential trace-heads are loop headers or targets of backward branches since program execution time is mainly spent in loops. Another important set of potential trace-heads are ones that follow the exit of an already formed trace (exit-heads). The ability to select trace-heads out of exit-heads ensures that execution that does not directly originate from the initial set of targets (e.g., loops) have the chance to be captured into a trace. Trace-heads are selected from potential trace-heads 103 when their associated counters 104 exceed a predefined threshold.

In the second step 102, trace recording is triggered to form a trace immediately after a hot trace-head is identified. The mechanism records every instruction or every branch following the execution of the selected trace-head until an end-of-a-trace condition is met. While the speed and extent of a trace selection algorithm to capture the program working set is largely determined by trace-head selection, the length and shape of the traces being formed are largely determined by the end-of-a-trace conditions.

Three end-of-a-trace conditions (or their more restrictive forms) are commonly present in prior trace selection algorithms, as demonstrated by US Patent Application Publication No. 2007/0079293, now U.S. Pat. No. 7,694,281, to Wang, et al., where the algorithm stops recording a trace:

1. When encountering the head of an already formed trace; or
2. When detecting a likely cycle in trace recording, e.g., when revisiting an entry already recorded in a trace buffer, or when encountering a possible backward taken branch; or
3. When the trace recording buffer exceeds a pre-defined length threshold.

In the following discussion explaining the present invention, the first termination condition identified above is referred to as the "stop-at-a-trace-head" condition. This condition has a known limitation that the present invention aims to address.

Trace grouping is a step to group single traces to form larger regions for a compiler to process. Trace grouping is a post-processing step of a trace selection engine as runtime recording can only produce linear traces (called single traces). U.S. Patent Application Publication No. 2007/0226700 to Gal, et al, demonstrates the construction of tree structures on top of single traces that resemble nested loops (called Trace-Tree selection).

A current limitation of Trace-Tree selection is that it can only capture computation in loops that are reasonably sized. As such, trace-tree selection may not achieve a very high coverage for codes that are not loop intensive. Another drawback of trace grouping is that it adds complexity to the optimizer because grouped traces are no longer single-entry, multiple-exit entities. If optimized as a group, the optimizer can no longer exploit the simple topology of traces. If traces are optimized individually, secondary traces of a trace tree are fragmented as in the NET approach because they are cut short by the head of the primary trace.

Application-specific trace selection defines an application-specific point to terminate a trace. For example, PyPy's Tracing JIT only terminates a trace when it has traced one loop iteration in a user-define Python program such that the trace essentially unrolls the interpreter loop.

The drawback is that such kind of tracing requires special knowledge of the application being traced. For PyPy, it traces a python interpreter that is written in a restricted subset of Python.

Path-profiling-based trace selection profiles branch histories (or execution paths) and identifies hot traces based on occurrences of the recorded branch histories.

U.S. Pat. No. 6,351,844 to Bala uses a translator to interpret the program and generate branch history data that includes a starting address and a branch history sequence. The branch history sequence records every taken branch from the starting address until it encounters a backward taken branch or an indirect branch. A branch history data is selected as a hot trace if within a time frame the occurrence of the branch history data exceeds a predefined threshold. The selection algorithm also combines traces to form cyclic traces.

US Patent Application Publication No. 2005/0081107 to DeWitt, et al., and U.S. Pat. No. 6,647,491 to Hsu, et al., use special hardware to record branch history and form traces based in software on branch history information.

When profiling is done in software, path profiling is more expensive than counter profiling for trace-heads used in NET approach. Most software translation and optimization systems today follow the NET approach. When profiling is done in hardware, the selection algorithm applies to binary traces only and requires special hardware support.

The present inventors have recognized that there are drawbacks of these known solutions.

More particularly, one drawback of NET-like trace selection algorithm, as recognized by the present inventors, is the stop-at-a-trace-head termination condition described above. This condition was introduced to avoid duplication across traces and to capture most of the execution quickly into traces which is required by most binary optimizers and translation systems.

However, when applying the trace-driven approach to a language dynamic compiler (that is, a compiler that compiles language intermediate representation directly to binaries), the ability to form quality traces becomes much more important as better formed regions can be translated into more efficient codes.

With the stop-at-a-trace-head termination condition, many traces are prematurely cut short. For instance, when a trace is formed at the entry-point of a method, stop-at-a-trace-head condition prevents any subsequent traces from "inlining" part of the method into the trace. This is important for object-oriented languages such as Java, C++, Python, and others, where programming styles encourages writing small methods which are called from multiple places.

Therefore, an exemplary objective of the present invention is to provide a selection algorithm that can produce quality single traces that can be effectively optimized by language compilers. The qualities being aimed at are longer traces and traces that cover an entire path through a method invocation or an entire cyclic path through a loop. These qualities provide higher efficiency in compilation.

Thus, the present inventors have recognized that a need exists for improving efficiency of a trace-driven language compiler and have developed a solution that modifies the conventional NET-like compilers in the manner explained below to arrive at an adaptive mechanism that reduces a disadvantage of this conventional method while utilizing its advantage.

SUMMARY OF THE INVENTION

In view of the foregoing, and other, exemplary problems, drawbacks, and disadvantages of the conventional systems, it is an exemplary feature of the present invention to provide a structure (and method) in which compilation efficiency is improved by improving the amount of computation captured in single traces.

In a first exemplary aspect, described herein is an apparatus, including a processor for executing instructions at a runtime and instructions for dynamically compiling the set of instructions executing at runtime. A memory device stores the instructions to be executed and the dynamic compiling instructions; and a memory device serves as a trace buffer used to store traces during formation during the dynamic compiling. The dynamic compiling instructions includes a next-executing-cycle (N-E-C) trace selection process for forming traces for the instructions executing at runtime, wherein the N-E-C trace selection process continues through an existing trace-head when forming traces without terminating a recording of a current trace if an existing trace-head is encountered.

In a second exemplary aspect, also described herein is an apparatus, including a processor for executing instructions at a runtime and instructions for dynamically compiling the set of instructions executing at runtime. A memory device store the instructions to be executed and the dynamic compiling instructions; and a memory device serves as a trace buffer used to store traces during formation during the dynamic compiling. The dynamic compiling instructions includes an adaptive selection scheme that selectively curbs duplication across traces. The adaptive selection scheme selects traces based on a predetermined hotness criterion such that: for traces determined as being hot trace-heads, a subsequent recording uses a next-executing-cycle (N-E-C) selection process that continues through an existing trace-head when forming traces without terminating a recording of a current trace if an existing trace-head is encountered; and for traces determined as being not-so-hot trace-heads, a subsequent recording uses a next-executing-tail (NET) selection process that additionally stops a current trace upon an occurrence of reaching any existing trace-head.

In a third exemplary aspect, also described herein is a method of dynamically compiling code, including a next-executing-cycle (N-E-C) trace selection process, as executed by a processor on a computer, for forming traces of a compilation of instructions executing at runtime. The N-E-C trace selection process continues through an existing trace-head when forming traces without terminating a recording of a current trace if an existing trace-head is encountered.

In a fourth exemplary aspect, also described herein is a method of dynamically compiling code, including an adaptive selection scheme, as executed by a processor on a computer, that selectively curbs duplication across traces. The adaptive selection scheme selects traces based on a predetermined hotness criterion such that: for traces determined as being hot trace-heads, a subsequent recording uses a next-executing-cycle (N-E-C) selection process that continues through an existing trace-head when forming traces without terminating a recording of a current trace if an existing trace-head is encountered; and for traces determined as being not-so-hot trace-heads, a subsequent recording uses a next-executing-tail (NET) selection process that additionally stops a current trace upon an occurrence of reaching any existing trace-head.

As will be clearer in view of the discussion below, the improvement in the amount of computation captured in single traces, as provided by the present invention, can improve the effectiveness of code optimizers and ultimately improve program performance. The methods of the present invention can be applied to any trace-based systems that use NET-like selec-

BRIEF DESCRIPTION OF THE DRAWINGS

The foregoing and other purposes, aspects and advantages will be better understood from the following detailed description of an exemplary embodiment of the invention with reference to the drawings, in which:

FIG. 3A shows an example code 300, and FIGS. 3B and 3C respectively show the difference between traces formed using NET and N-E-C;

EXEMPLARY EMBODIMENTS OF THE INVENTION

Figure 1:
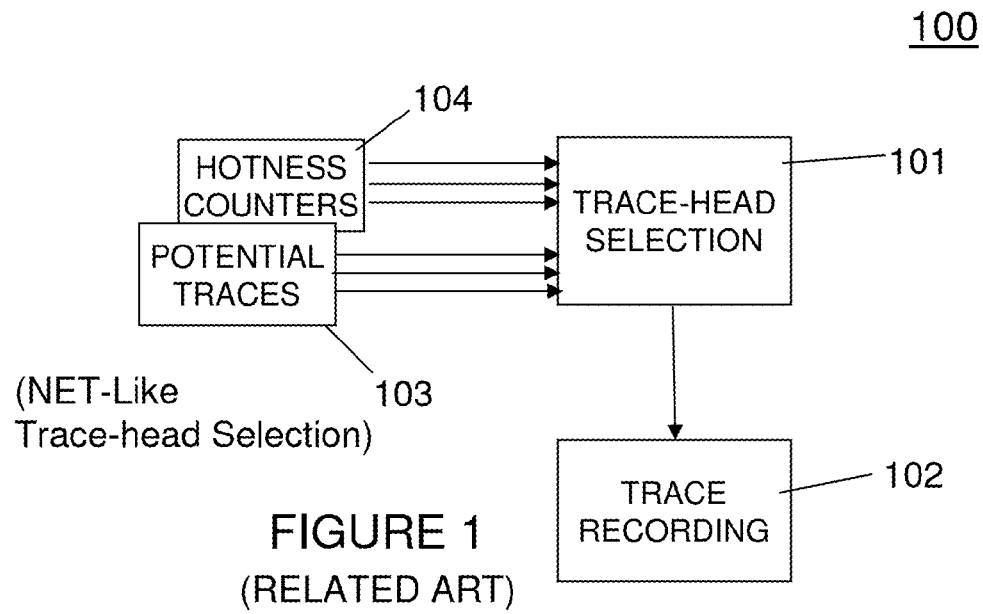
FIG. 1 shows a flowchart 100 that demonstrates the two-step trace selection algorithms used in the conventional next-executing-tail (NET) selection algorithm.
Figure 2:
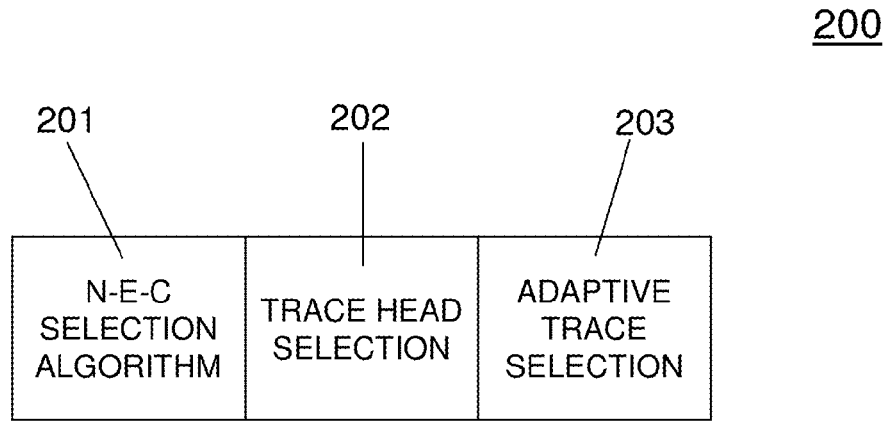
FIG. 2 shows in block diagram format 200 the three components of a system implementing an exemplary embodiment.

Referring now to the drawings, and more particularly to FIGS. 2-12, there are shown exemplary embodiments of the method and structures according to the present invention.

The present invention provides an adaptive system to select hot traces for dynamic code optimizers. The system 200 exemplarily diagrammed in FIG. 2 includes the following three components.

In a first component 201, a new selection algorithm, referred to herein as the "next-executing-cycle" (N-E-C) selection algorithm, differs from the conventional NET-like selection algorithm in that N-E-C does not terminate a trace if trace recording encounters an existing trace-head. In other words, one aspect of the present invention is that it removes the stop-at-a-trace-head condition from the end-of-a-trace conditions of the NET-like selection algorithm, thereby addressing one of the above-mentioned problems noted by the present inventors with conventional methods.

Compared to NET-like selection, one benefit of the N-E-C selection algorithm is that traces are formed longer, as will be better understood from the examples provided below. Thus, there is more "inlining" (i.e., a trace contains an entire path through a method invocation) happening on single traces, increasing the probability that a single trace captures an entire cyclic path through a loop. Compared to the trace grouping approach, this approach expands the scope of traces while preserving the simple topology of traces as a single-entry multiple-exit entity. It is noted that, in general, longer traces and inlining improve efficiency of a compilation.

In a second component 202 of the present invention, trace-heads are selected as based on a minimal access threshold as well as a hotness criterion that is expressed as a minimal relative execution frequency with respect to an execution window. Only if a potential trace-head is executed frequently enough relative to the window, can it be selected as a trace-head.

One downside, however, of the N-E-C selection is the additional duplication it introduces compared to the NET-like selection. There can be a non-linear increase of duplication factor (i.e., the amount of duplicated entries across all traces) when the trace cache is approaching a very high coverage (also known as trace-cache hit-ratio, e.g., when >95% of execution happens in the trace-cache). This is because, when reaching high hit-ratio, N-E-C is selecting much colder codes that tend to contain fewer loops. That means recorded traces are more likely to duplicate portions of existing traces before forming a cycle.

Therefore, in an exemplary embodiment of the present invention, the hotness criteria is introduced to ensure that N-E-C selection is only applied to relatively hot portions of the codes and to avoid excessive duplication.

In a third component 203, a two-level adaptive trace selection mechanism applies the high quality, more expensive selection to relatively hot region of the codes and uses a very efficient selection algorithm to cover the rest.

One downside of the hotness criteria approach is that it sometimes limits the maximum coverage of a trace cache. Codes that are executed many times, but not frequently enough, may never be selected. This is especially detrimental to long running applications where ideally one would like the coverage to approach 100% eventually.

For some systems such as Java, high selection coverage is necessary because the big performance disparity between simple jitting and interpretation can be as high as several times. Thus, the initial coverage needs to be very high to reduce the time spent in interpretation.

An exemplary embodiment of the two adaptive selection mechanisms in the adaptive trace selection component 203 can be implemented, as follows.

The first incarnation is a two-level adaptive selection. Initially, trace selections are done by the level-1 selection that aims to achieve a high coverage (e.g., >95%) as quickly as possible using NET-like selection or a selection mechanism based of static-regions such as methods. The level-2 selection is then applied to traces selected by level-1 and only to relatively hot region of the code (e.g., with a coverage target of 80%) using N-E-C selection.

The second incarnation 302 applies different end-of-a-trace conditions based on the hotness of a trace head. It introduces another threshold for trace-head selection called bypass-hotness-threshold. This threshold is higher than the original minimal trace-head threshold. A potential trace-head failing the hotness criterion but passing the bypass-hotness-threshold can be selected as trace-head. These trace-heads are less hot than the ones passing the hotness condition. In the subsequent trace recording, NET-like trace termination conditions can be applied to them.

Next-Executing-Cycle Selection

The N-E-C selection follows NET's two-step approach of hot trace-head selection plus trace recording.

End-of-trace conditions. Selection of a hot trace-head immediately triggers trace recording until the next entry meets one of the following conditions:
1. The target is already in the recording buffer, i.e., a cycle is detected; or
2. The recording buffer exceeds a pre-defined length; or
3. The target throws an exception; or
4. The target jumps to native codes (e.g., invoke or return to a native method).

When a trace is terminated due to the first condition 1 and the repeating entry is in the middle of the trace buffer, the sequence is split at the inner join-node into a non-cyclic trace (A) and a head-cycle trace (B). The splitting is necessary because single traces cannot have inner-join. If the repeating entry is already a trace-head, trace B is discarded as only one trace can be formed at a trace-head.

Trace-head selection. A potential trace-head is selected as hot trace-head if its counter exceeds both a predefined minimal access frequency (minimal_count) and a dynamically computed one. The latter is computed from a predefined hotness threshold (HOT) and some ticks elapsed between the first recorded time (init_TS) and the current time stamp (curr_TS):

$$hotness\_count=(currTS-initTS)*HOT$$

The hotness threshold requires that a trace-head not only has to reach a minimal threshold, but also needs to reach the threshold at a minimal rate. Thus, a target that is rarely used but eventually exceed the predefined minimal threshold will not be selected as hot because of the second threshold (hotnesss_count).

FIG. 3A-3C shows an example of a polymorphic call-site that causes a trace being formed at entry-point to a method and the impact of NET and NEC to form traces that subsequently call this method. FIG. 3A shows an exemplary code example 300 that demonstrates a motivating example of the N-E-C selection of the present invention. FIG. 3B shows the NET trace selection 301 and FIG. 3C shows the corresponding N-E-C selection 302.

In this example, block R (the entry-point to method Red( )) is first marked as an exit-head because it is another target of a polymorphic call-site (r.paint( )) and subsequently becomes a trace-head. Once a trace is formed from block R, FIGS. 3B and 3C show that NET and N-E-C behave very differently, as follows.

With NET, shown in FIG. 3B, any subsequent calls to method Red( ) (e.g., via foo( )) has to go through Trace 2 (R-X), resulting in two fragmented traces, trace 3 (Y) and 4 (Z).

With N-E-C, shown in FIG. 3C, Trace 3 is formed with Y-R-Z where method Red( ) is completely inlined to trace 3.

Figures 4A, 4B:
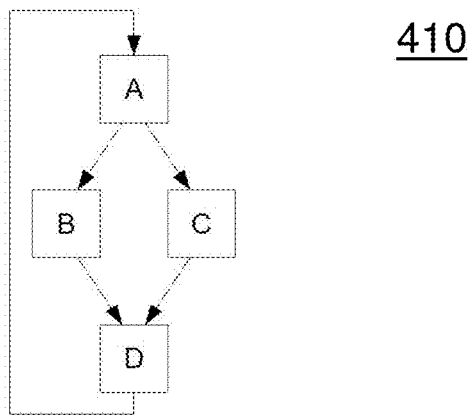
FIGS. 4A and 4B respectively shows a second example code 400 and control-flow-graph 410, and FIGS. 4C and 4D respectively show the NET trace selection 420 and N-E-C trace selection 430 of this example.

FIGS. 4A-4D shows another motivating example 400 involving loops. The code 400 of FIG. 4A and the control-flow-graph 410 of FIG. 4B show an example of a loop taking completely different paths at different phases of the program and the impact 420 of NET (FIG. 4C) and the impact 430 of N-E-C selection (FIG. 4D) on forming traces on these two paths.

Figure 4C:
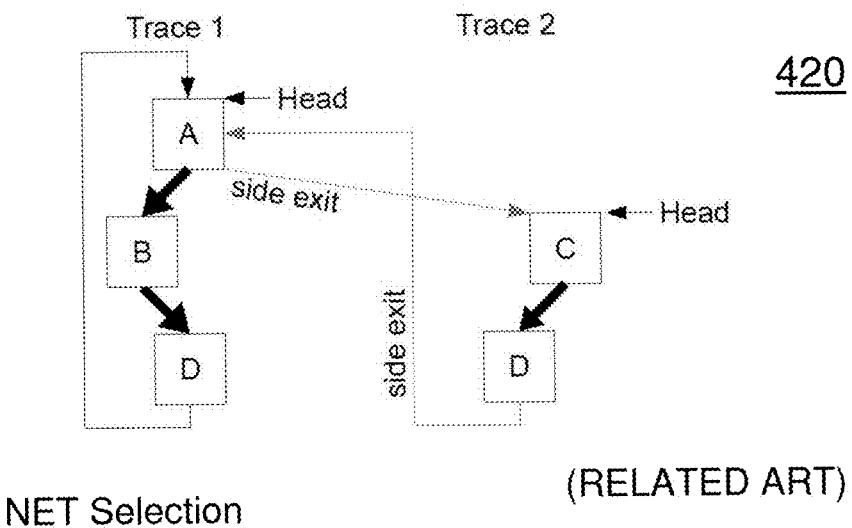
Figure 4D:
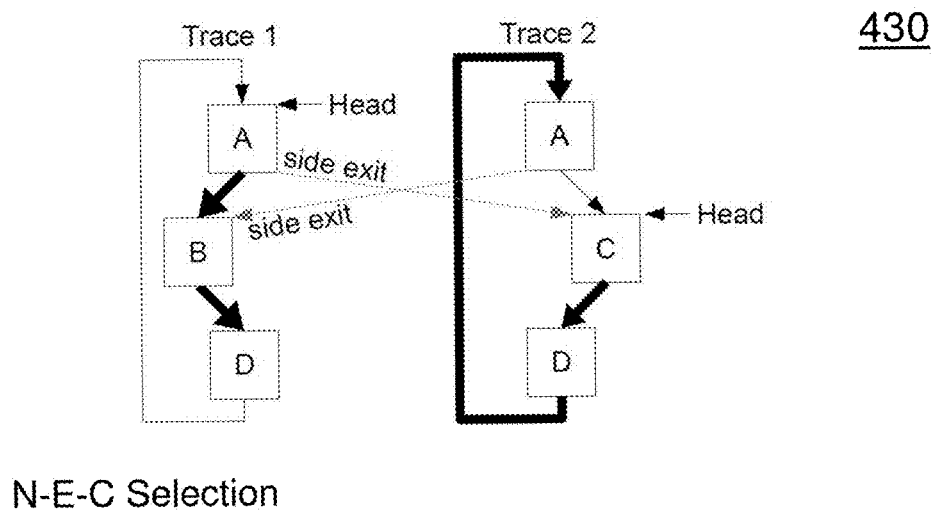

In this case, the loop has two distinctive path (A-B-D-A and A-C-D-A) that are not inter-leaved (e.g., when A is a loop-invariant condition). As shown in FIG. 4C, NET selection will create an A-B-D-A trace (head-cycle-trace) and a C-D trace which is fragmented. As shown in FIG. 4D, N-E-C, on the other hand, will create two head-cycle trace, an A-B-D-A trace and a C-D-A-C which is only fragmented at the first iteration of the loop.

Note that if A is not loop invariant and alternates between paths through B and C in consecutive iterations, the second trace would be recorded as CD AB D A. This trace will be split into two, C-D and A-B-D-A. The latter will be discarded because the first trace is already formed at A. In other words, trace splitting achieves the effect that if a branch goes into the same direction in consecutive iterations, it is likely to go in this direction for subsequent iterations thus is worth to form a full-cycle at the branch.

Adaptive Trace Selection Mechanism

This mechanism of the present invention accommodates the need for both producing high quality traces (thus using more expensive selection mechanism) and achieving high selection coverage without excessive code explosion (thus require efficient selection mechanism). There are two mechanisms for adaptive trace selection in this method.

A. The first mechanism is a two-pass adaptive selection approach that works as follows.
1) The first-level selection algorithm aims at selecting fresh codes into the trace cache as quickly as possible (as such it is coverage-driven). NET-like selection algorithms could be used as first-level algorithms because of the stop-at-a-trace-head termination condition. Other choices of level-1 selection could be based on static regions, such as using a method-based selection scheme. We actually found method-based selection such as the one used by a typical method JIT is as efficient as NET selection when targeting on high coverage.

A method-based Level-1 selection algorithm works as follows:
First, the selection engine maintains a counter for each method executed, and selects a method if the counter exceeds a pre-defined threshold. Second, method-based selection does not imply method-based compilation. Regions selected such can be compiled by a simple JIT one basic block at a time with additional hooks inserted to the jitted basic block to allow for Level-2 trace selection a.

To allow trace recording for Level-2 selection on jitted codes, at the end of each basic block, the JIT can insert a guarded call to the trace selection engine that does recording of basic blocks when trace recording is enabled on the code. To allow trace-head selection for Level-2 selection on jitted codes, the JIT can instrument all basic blocks that are targets of a backward jump (within a method) to monitor the initial set of potential trace-heads. Exit-heads will be monitored at runtime when execution exiting a trace.

2) The second-level selection algorithm is designed to form regions that are better suited for compilation. N-E-C can serve as a level-2 selection algorithm.

This adaptation scheme can reach high coverage very fast. But the downside is that it would delay generation of quality traces. So it is best applied to long running programs and/or systems with relatively large performance difference between interpretation and basic jitting compared to that between basic jitting and optimized jitting.

B. The second approach is a one-pass adaptive selection algorithm that combines N-E-C and a NET-like selection. It works as follows:

A hot trace-head is selected if its counter exceeds both the minimal access frequency (minimal_count) and the accesses frequency computed by hotness threshold (hotness_count).

A not-so-hot trace-head is selected if its counter is less than hotness_count, but exceeds bypass_hotness_count where bypass_hotness_count>minimal_count.

When recording traces, apply N-E-C's termination conditions for hot trace-heads, and NET-like termination conditions for not-so-hot trace-heads.

The one-pass adaptation scheme is easier to implement and can form quality traces sooner. But the downside is that it achieves high coverage slower than the two-pass approach because bypass_hotness_threshold is higher than minimal_threshold. This approach is more suitable for shorter running programs and/or systems where the difference between interpretation and basic jitting is less than that between basic jitting and advanced jitting.

Figure 5:
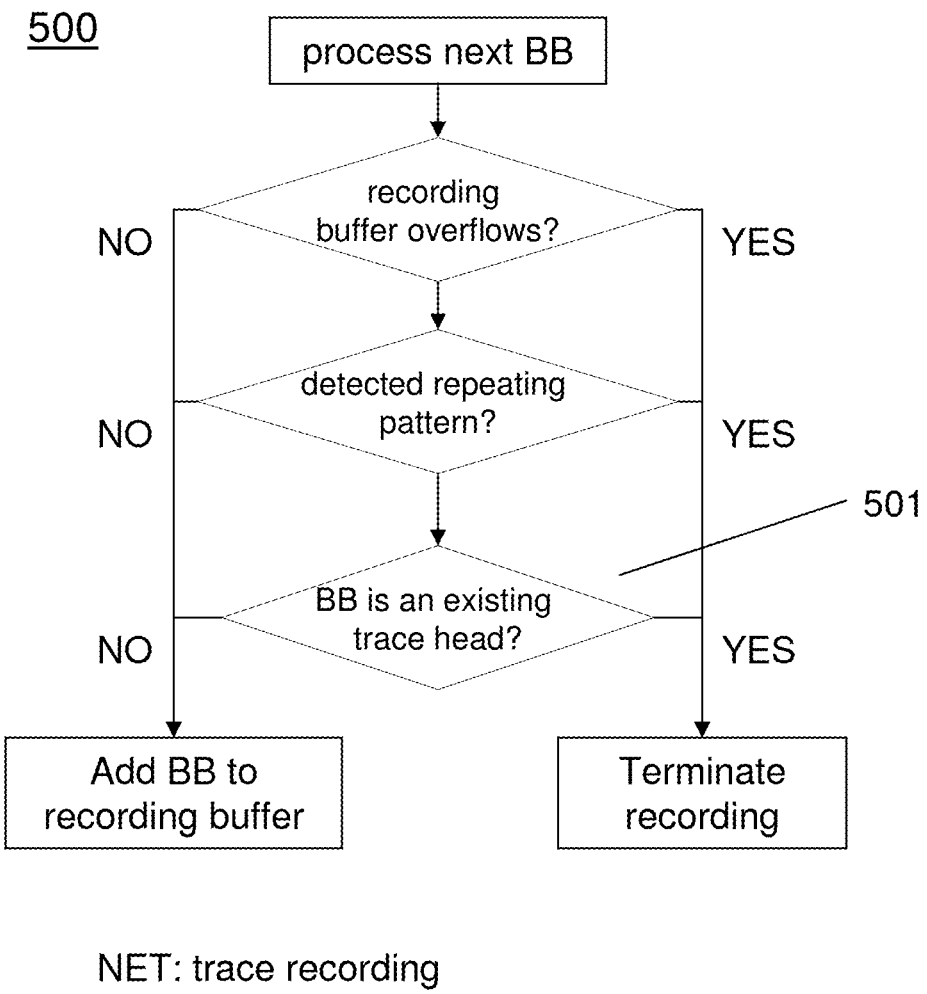
FIG. 5 shows a flowchart 500 of the conventional NET trace recording process.
Figure 6:
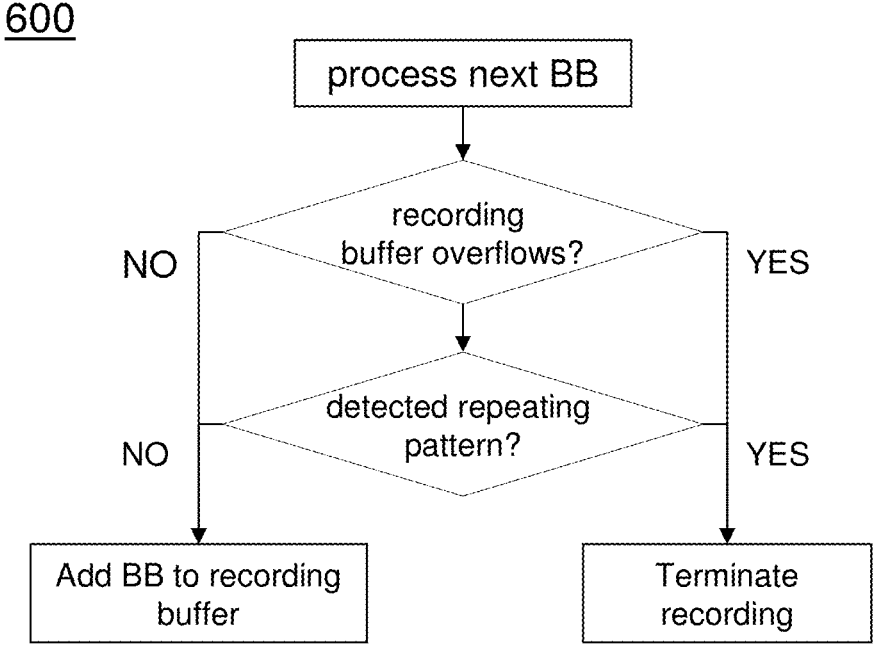
FIG. 6 shows a comparison flowchart 600 for the N-E-C trace recording process used in the present invention in combination with the NET process.

To summarize the discussion above and assist in understanding, FIGS. 5 and 6 show comparison flowcharts 500, 600 that visually demostrates a key difference between the conventional NET trace recording and the new N-E-C trace recording. Note that "BB" in this figure means "basic block" and that the final trace recording stop mechanism 501 of NET is missing in the N-E-C trace recording flowchart 600.

Figure 7:
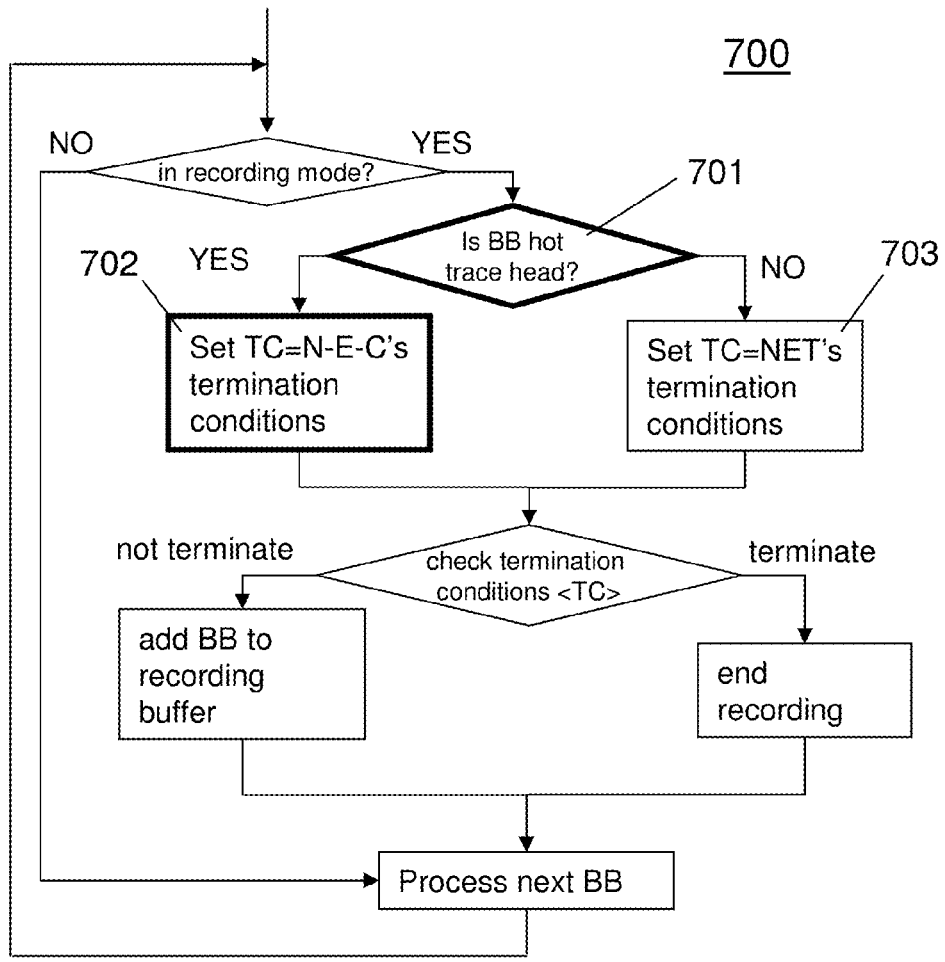
FIG. 7 shows a flowchart 700 for an exemplary embodiment of the present invention using both the NET and N-E-C termination conditions.

FIG. 7 shows, as a summary, a flowchart 700 of an exemplary implementation of the adaptive scheme during trace recording. Note that the decision in step 701 whether a hot trace head is involved decides whether the N-E-C termination conditions are used 702 or the NET termination conditions are used 703. From the above discussion, it should be understood that the adaptive scheme shown in FIG. 7 permits the present invention to reduce disadvantages of the conventional NET mechanism while still utilizing its advantages.

More specifically, the stop-at-existing-trace-head termination condition of NET was originally introduced in binary translators to curb duplication across traces. The present inventors, however, have recognized that this termination condition severely restructs the ability to form long traces, as traces are fragmented by existing trace heads. Long traces have thus been recognized as desirable.

The reason that the stop-at-existing-trace-head termination condition is now recognized as potentially undesirable for trace-driven code optimizers it that it limits the "inlining" effect on traces. That is, if a trace is already formed at the entry point of a method, then the method cannot be "inlined" to any subsequent traces calling the method. The effect of inlining was demonstrated in the two examples above comparing the NET-like processing with the N-E-C processing.

Additionally, the stop-at-existing-trace-head termination condition is recognized as limiting the ability to capture cyclic paths. If a loop contains two distinct cyclic paths, only one can be captured in a single trace. The other will be fragmented by the head of the first trace.

As shown in FIG. 6, the N-E-C method eliminates the stop-at-existing-trace-head termination condition. However, N-E-C has a drawback of causing duplication across traces (code explosion), especially when forming traces out of less loopy codes. To curb duplication, an adaptive selection scheme, such as exemplarily shown in FIG. 7, uses hotness to determine whether to use N-E-C or NET conditions, thereby both gaining advantages while reducing disadvantages of the conventional NET-like compilation processes.

Figure 8:
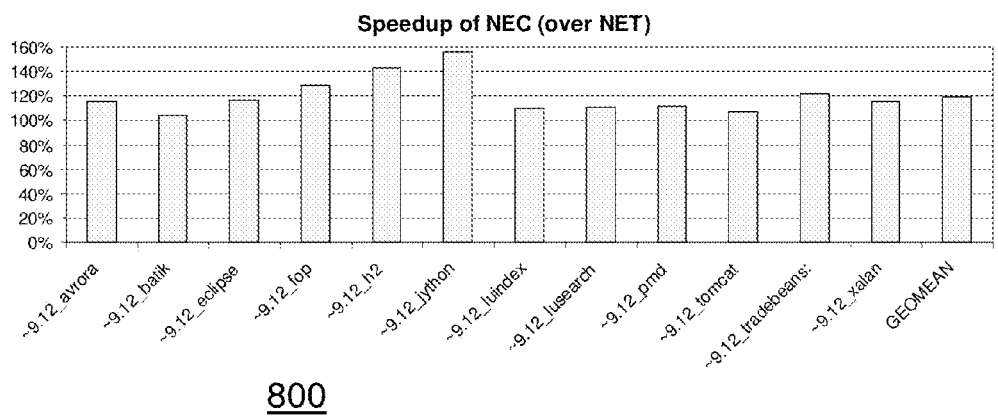
FIGS. 8-10 show exemplary metrics demonstrating the improvement in compilation efficiency for N-E-C processing.
Figure 9:
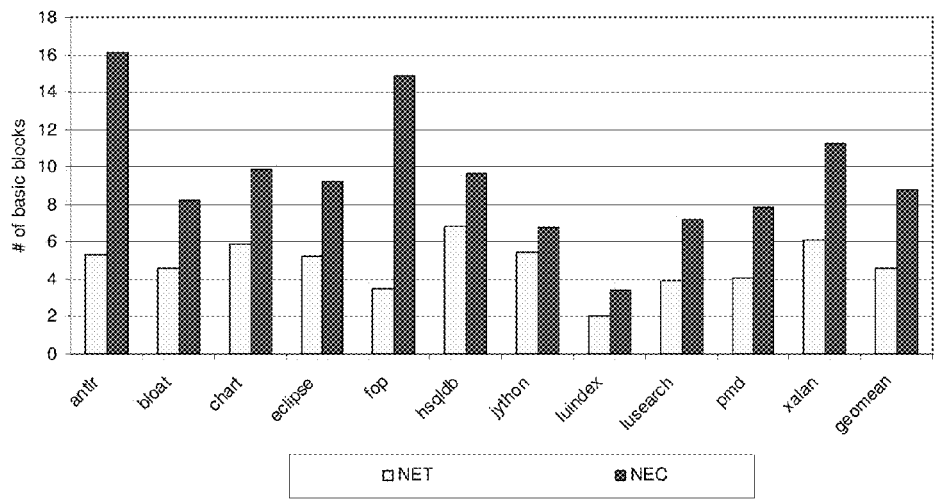
Figure 10:
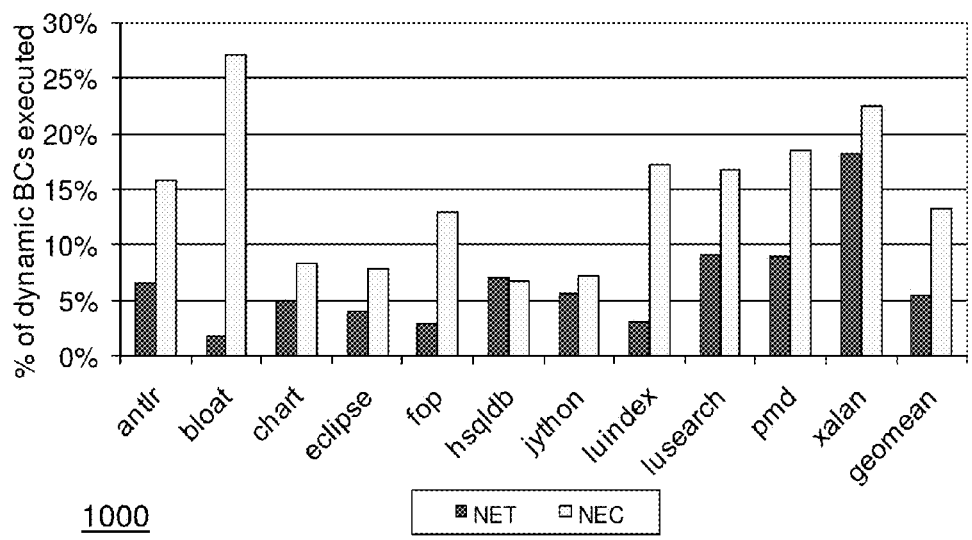

FIGS. 8-10 shows the performance impact of the N-E-C versus NET by demonstrating metrics using the DaCapo standard Java benchmark suite. As shown in FIG. 8, N-E-C improves the trace JIT performance over NET by up to 57% and on average by 20%. FIG. 9 shows the improvement 900 of N-E-C on dynamic trace length, remembering from the discussion above that longer traces are better. FIG. 10 shows the improvement 1000 of N-E-C on inlining, remembering from the discussion above that, generally, more inlining is better.

Exemplary Hardware Implementation

Figure 11:
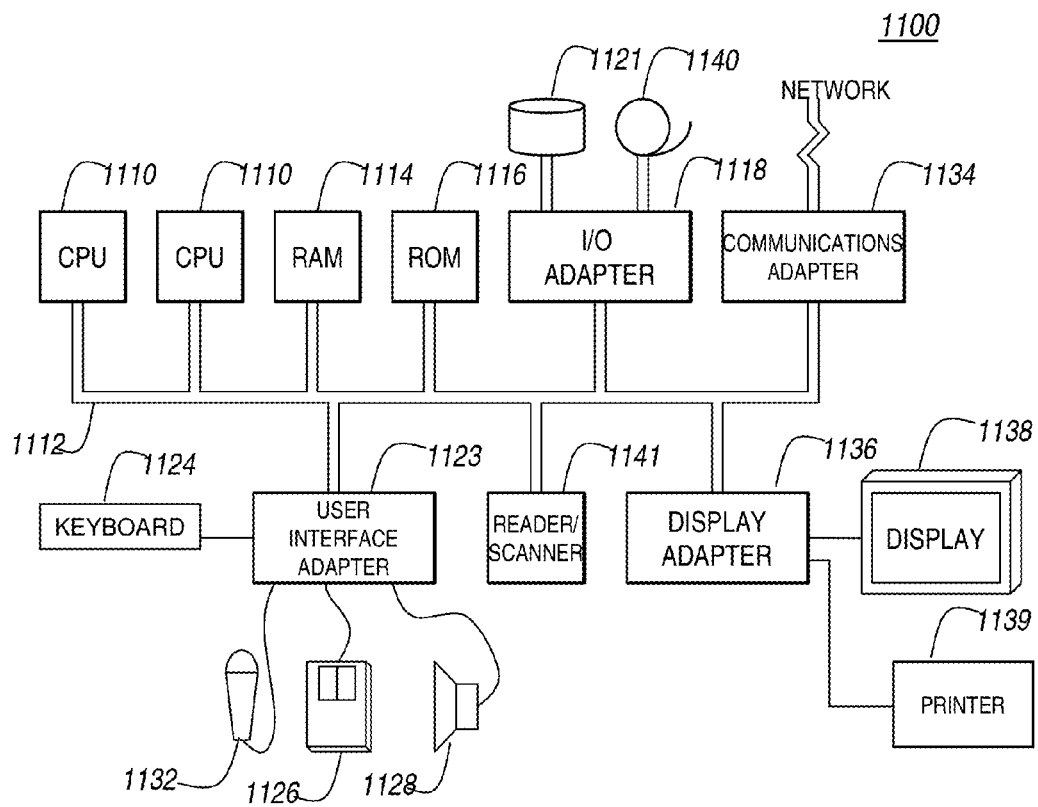
FIG. 11 exemplarily shows a hardware/data processing system 1100 that could be used to implement the method of the present invention.
Figure 12:
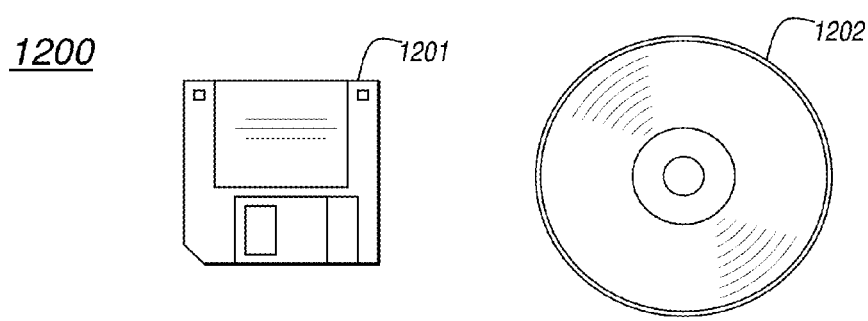
FIG. 12 exemplarily shows storage media 1200 that could be used for storing computer-readable instructions to implement the method of the present invention.

FIG. 11 illustrates a typical hardware configuration of an information handling/computer system 1100 in accordance with the invention and which preferably has at least one processor or central processing unit (CPU) 1110.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., a reader/scanner 1141, and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM 1114 associated with a CPU 1110, as represented by a fast-access storage device, for example. Alternatively, the instructions may be contained in another signal-bearing storage media 1200, such as a magnetic data storage diskette 1201 or optical diskette 1202 (FIG. 12), directly or indirectly accessible by the CPU 1110.

Whether contained in the diskette 1200, the computer/CPU system 1100, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission media such as using digital and/or analog formats and hardware and in communication links and wireless devices. In an illustrative embodiment of the invention, the machine-readable instructions may comprise software object code.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
   a processor for executing instructions at a runtime and instructions for dynamically compiling said set of instructions executing at runtime;

a memory device for storing said instructions to be executed and said dynamic compiling instructions; and a memory device serving as a trace buffer used to store traces during formation during said dynamic compiling, wherein said dynamic compiling instructions comprises a next-executing-cycle (N-E-C) trace selection process for forming traces for said instructions executing at runtime, wherein said N-E-C trace selection process continues through an existing trace-head when forming traces without terminating a recording of a current trace if an existing trace-head is encountered.

2. The apparatus of claim 1, wherein said N-E-C trace selection process stops recording said current trace if one of the following occurs:

a complete cycle is formed in said trace buffer; and a predetermined maximum buffer length is exceeded.

3. The apparatus of claim 1, wherein said set of computer-executable instructions further comprises an adaptive selection scheme that selectively curbs duplication across traces, wherein said adaptive selection scheme selects traces based on a predetermined hotness criterion.

4. The apparatus of claim 3, wherein said hotness criterion is expressed as a minimal relative execution frequency with respect to an execution window.

5. The apparatus of claim 3, wherein, for traces determined as being hot trace-heads, a subsequent recording uses said N-E-C selection process.

6. The apparatus of claim 3, wherein, for traces determined as being not-so-hot trace-heads, a subsequent recording uses a next executing tail (NET) selection process that does stop recording a current trace upon an occurrence of reaching any existing trace-head.

7. The apparatus of claim 3, wherein said hotness criterion is based upon a predetermined threshold, said predetermined threshold comprising both a predetermined minimal access frequency and a dynamically-computed frequency.

8. The apparatus of claim 7, wherein said dynamically-computed frequency is calculated as:

$$\text{hotness\_count} = (\text{currTS} - \text{intTS}) * \text{HOT},$$

where HOT is a predefined hotness threshold value, init_TS is a first recorded time, and curr_TS is a current time stamp.

9. An apparatus, comprising:

a processor for executing instructions at a runtime and instructions for dynamically compiling said set of instructions executing at runtime;

a memory device for storing said instructions to be executed and said dynamic compiling instructions; and a memory device serving as a trace buffer used to store traces during formation during said dynamic compiling, wherein said dynamic compiling instructions comprises an adaptive selection scheme that selectively curbs duplication across traces, said adaptive selection scheme selecting traces based on a predetermined hotness criterion such that:

for traces determined as being hot trace-heads, a subsequent recording uses a next-executing-cycle (N-E-C) selection process that continues through an existing trace-head when forming traces without terminating a recording of a current trace if an existing trace-head is encountered; and for traces determined as being not-so-hot trace-heads, a subsequent recording uses a next-executing-tail (NET) selection process that stops a current trace upon an occurrence of reaching any existing trace-head.

10. The apparatus of claim 9, wherein both said N-E-C selection process and said NET selection process stop recording said current trace if one of the following occurs:

a complete cycle is formed in said trace buffer; and a predetermined maximum buffer length is exceeded.

11. A method of dynamically compiling code, said method comprising:

a next-executing-cycle (N-E-C) trace selection process, as executed by a processor on a computer, for forming traces of a compilation of instructions executing at runtime, wherein said N-E-C trace selection process continues through an existing trace-head when forming traces without terminating a recording of a current trace if an existing trace-head is encountered.

12. The method of claim 11, wherein said N-E-C trace selection process stops recording said current trace if one of the following occurs:

a complete cycle is formed in said trace buffer; and a predetermined maximum buffer length is exceeded.

13. The method of claim 11, wherein said set of computer-executable instructions further comprises an adaptive selection scheme that selectively curbs duplication across traces, wherein said adaptive selection scheme selects traces based on a predetermined hotness criterion.

14. The method of claim 13, wherein, for traces determined as being hot trace-heads, a subsequent recording uses said N-E-C selection process; and wherein, for traces determined as being not-so-hot trace-heads, a subsequent recording uses a NET-like selection process that additionally stops a trace upon occurrence of reaching any existing trace-head.

15. The method of claim 13, wherein said predetermined threshold comprises both a predetermined minimal access frequency and a dynamically-computed frequency.

16. The method of claim 13, wherein said dynamically-computed frequency is calculated as:

$$\text{hotness\_count} = (\text{currTS} - \text{intTS}) * \text{HOT},$$

where HOT is a predefined hotness threshold, init_TS is a first recorded time, and curr_TS is a current time stamp.

17. A non-transitory, signal-bearing storage medium, tangibly embodying the method of claim 11.

18. The storage medium of claim 17, as comprising one of:

a random access memory (RAM) device on a computer;

a read only memory (ROM) device on a computer; and a standalone storage device intended to be connected to an input port of a computer.

19. A method of dynamically compiling code, said method comprising:

an adaptive selection scheme, as executed by a processor on a computer, that selectively curbs duplication across traces, said adaptive selection scheme selecting traces based on a predetermined hotness criterion such that:

for traces determined as being hot trace-heads, a subsequent recording uses a next-executing-cycle (N-E-C) selection process that continues through an existing trace-head when forming traces without terminating a recording of a current trace if an existing trace-head is encountered; and for traces determined as being not-so-hot trace-heads, a subsequent recording uses a next-executing-tail (NET) selection process that additionally stops a current trace upon an occurrence of reaching any existing trace-head.

20. The method of claim 19, wherein both said N-E-C selection process and said NET selection process stop recording said current trace if one of the following occurs:
- a complete cycle is formed in said trace buffer; and
- a predetermined maximum buffer length is exceeded.

21. A non-transitory, signal-bearing storage medium, tangibly embodying the method of claim 19.

22. The storage medium of claim 21, as comprising one of:
- a random access memory (RAM) device on a computer;
- a read only memory (ROM) device on a computer; and
- a standalone storage device intended to be connected to an input port of a computer.

* * * * *